STARCH PRODUCT AND METHOD OF MAKING SAME

Richard L. Curtin, Town and Country, Ernest A. Sowell, St. Louis, and Barrett L. Scallet, Clayton, Mo., assignors to Anheuser-Busch, Incorporated, St. Louis, Mo., a corporation of Missouri
No Drawing. Filed Feb. 24, 1959, Ser. No. 794,859
9 Claims. (Cl. 106—213)

The present invention relates to an improved starch product and to a method of making same. More particularly, the present invention relates to a liquid laundry starch product and to a method of making said product. Specifically, the present invention relates to a liquid laundry starch composition which has relatively little tendency to absorb moisture from the atmosphere after being applied to a fabric. The liquid laundry starch composition of the present invention also has a long shelf life over a wide temperature range, and is free from corrosive action on any metal objects which may be attached to the starched fabric.

Liquid laundry starches are widely used in the home for starching because of their simplicity and economy of use, that is, they do not require cooking and preparation on the part of the user. In general, the liquid laundry starches avoid the lumpy compositions often prepared in the home and result in a more satisfactory starching operation because they are usually made from specially modified starches, and contain constant quantities of various adjuncts which enhance the ease of ironing and the finished appearance of the fabric.

Commercial liquid laundry starch products are essentially fluid dispersions of cooked starch. Such a colloidal system containing only starch and water is relatively unstable and will separate, thicken or gel to an irreversible and unusable state within a few hours or days. Cooling aggravates this condition. Consequently, to be a suitable article of commerce a liquid laundry starch product must be protected with additives against the adverse effects of prolonged storage over a wide range of temperatures.

In addition to storage life, the effectiveness of a liquid laundry starch product for use in the home depends upon the ease of application, freedom from deleterious action on fabric or equipment, and the quality of finish that it imparts to the starched material.

Furthermore, a liquid laundry starch must not take up water from the atmosphere after it is applied to a fabric. Present liquid laundry starches have a tendency to be hygroscopic, that is, to absorb water from the atmosphere, thus leaving the starched fabric in a limp, damp condition. Since starches are used to give fabrics a stiff neat appearance a hygroscopic starch is very undesirable. This is particularly true in areas of high humidity, such as the States which border on the Gulf of Mexico.

It is an object of the present invention to provide a liquid laundry starch which has relatively little tendency to take up water from the atmosphere. A further object is to provide a liquid laundry starch which has no deleterious action on fabric or metal. Another object of the present invention is to provide a liquid laundry starch which has increased stability on prolonged storage over a wide range of temperatures.

More specifically, it is an object of the present invention to provide a liquid laundry starch having included therein a mixture of borax and boric acid in the approximate ratio of about 1.6 parts boric acid to about 1 part borax. A further object is to provide a liquid laundry starch having a mixture of polyethylene glycol esters of fatty acids incorporated therein.

A further object of the present invention is to provide a novel method of preparing a liquid laundry starch which will fulfill all of the objects and advantages sought therefor.

These and other objects and advantages will become apparent hereinafter.

The present invention is embodied in a liquid laundry starch comprising starch, boric acid and borax. More particularly, the present invention includes a liquid laundry starch comprising an oxidized starch, a polyethylene glycol ester of a fatty acid, boric acid and borax. The present invention also comprises a method of preparing a liquid laundry starch comprising adding boric acid, borax and a polyethylene glycol ester of a fatty acid after the starch has been cooked. The invention further consists in the process hereinafter described and claimed and in the liquid laundry starch made by said process.

A detailed description of the present invention follows:

Present liquid laundry starches contain a variety of additives, such as preservatives, anti set-back agents, coloring agents, perfumes, and ironing aids. These additives produce a variety of starch products, some more effective in one respect than another. In the present invention, a liquid laundry starch has been produced wherein the novel combinations of ingredients coact to provide a product which is substantially less hygroscopic than starches presently available. The novel ingredients in the present invention include a combination of borax and boric acid in the approximate ratio of about 1.6 parts boric acid to 1 part borax. From about 10% to about 47.5% and preferably 16% to 16.5%, boric acid and borax by weight based on the weight of starch should be used to produce a product having the desired properties.

Certain polyethylene glycol esters of fatty acids are also compounded into the present composition. Preferably, a combination of two different polyethylene glycol esters of fatty acids is used, since such a combination gives definitely superior results. However, a single polyethylene glycol ester of a fatty acid can be used as shown by Example III. We prefer to use about 1% of each ester based on the weight of dry starch solids. If more than about 1% of these compounds is used, there are no deleterious effects on the final composition, however, the properties of the final composition are not enhanced by using excess reactant. As little as about 0.5% of a polyethylene glycol ester of a fatty acid can be used and still achieve substantially good results.

Polyethylene glycol esters of fatty acids having a molecular weight of from about 400 to about 1000 are preferably used. Specifically preferred are polyethylene glycol monostearate having a molecular weight of about 1000, and polyethylene glycol monolaurate having a molecular weight of about 400.

In preparing the liquid laundry starch composition of the present invention, it is preferred to use a hypochlorite oxidized corn starch. Although other starches such as wheat starch, potato starch, unmodified corn starch, etc., can be used, the oxidized corn starch produces a superior finish on the starched fabric. The amount of starch used is from about 7% to about 14% by weight based on the amount of water. Preferably about 10% starch based on the amount of water is used.

The starch is hypochlorite oxidized in a manner well known to the starch industry. The degree of hypochlorite oxidation imparted to the starch should fall within the range of about 10 to about 20 Scott. The Scott viscosity test is run at a solids content of about 4%.

Other substances such as bluing, fluorescent whitening agents, perfume, and a preservative can be incorporated in the composition.

The following are examples of typical formulations prepared according to this invention, and give a more detailed description of the method in which the liquid laundry starch product is prepared.

EXAMPLE I

| | |
|---|---|
| Water _____grams (g.)__ | 5000.0 |
| Hypochlorite oxidized corn starch _____g__ | 500.0 |
| Boric acid _____g__ | 50.0 |
| Borax (technical grade) _____g__ | 31.2 |
| Polyethylene glycol monostearate (mol. wt. 1000) g__ | 5.0 |
| Polyethylene glycol monolaurate (mol. wt. 400) g__ | 5.0 |
| Bluing _____g__ | 0.05 |
| Fluorescent agent _____g__ | .68 |
| Perfume _____milliliters (ml.)__ | 0.3 |
| Preservative _____g__ | 2.0 |

The oxidized starch is weighed, added to the water, agitated, and cooked with live steam for approximately 30 minutes. After thorough cooking, the pasted starch is cooled to approximately 180° F. At this temperature, the borax and boric acid are added to the starch paste and mixed. Cooling and agitation are continued until a temperature of approximately 160° F. is reached. The two polyethylene glycol esters of fatty acids, polyethylene glycol monostearate and polyethylene glycol monolaurate, are added at this point. Mixing and cooling are continued until the composition reaches a temperature of 120° F. At this temperature, the fluorescent whitening agent, bluing, perfume, and preservative are added to the composition. If desired, a portion of the water may be withheld at the beginning and added at the completion of the operation in order to control the level of total solids.

The polyethylene glycol esters of fatty acids are added after the starch has been cooked, rather than cooking them with the starch. This method of addition results in a liquid laundry starch product which has better cold stability and better shelf life than products compounded in other ways.

The borax and boric acid also are added after the oxidized starch has been pasted. By so adding these ingredients, the final starch product has less hygroscopicity and better cold stability than products compounded in other ways.

EXAMPLE II

| | |
|---|---|
| Water _____g__ | 5000.0 |
| Oxidized starch _____g__ | 700.0 |
| Boric acid _____g__ | 70.0 |
| Borax (T.G.) _____g__ | 45.5 |
| Polyethylene glycol monostearate (mol. wt. 1000) g__ | 7.0 |
| Polyethylene glycol monolaurate (mol. wt. 400) g__ | 7.0 |
| Bluing _____g__ | .07 |
| Fluorescent agent _____g__ | 0.7 |
| Perfume _____ml__ | 0.3 |
| Preservative _____g__ | 2.0 |

The composition of Example II is prepared in the same manner as Example I.

EXAMPLE III

| | G. |
|---|---|
| Water _____ | 5000.0 |
| Oxidized starch _____ | 350.0 |
| Boric acid _____ | 35.0 |
| Borax (T.G.) _____ | 22.8 |
| Polyethylene glycol monostearate (mol. wt. 1000) | 3.5 |
| Bluing _____ | 0.035 |
| Preservative _____ | 1.0 |

The composition of Example III is prepared in the same manner as Example I.

The liquid laundry starch compositions of Examples I, II and III have good shelf life and cold weather stability, are not corrosive to metal and fabric, and provide a non-hygroscopic finish to a starched fabric.

The products of Examples I and II are superior to the product of Example III in so far as cold weather stability is concerned. This is believed to be caused by the combination of polyethylene glycol esters of fatty acids used in these compositions.

The composition shown in Example I is preferred because of overall cost, shelf life and shows the best hygroscopic properties. As hereinbefore more fully explained, when the humidity is high it is important that a liquid laundry starch be non-hygroscopic. The following table, Table I, shows a comparison of the liquid laundry starch of Example I and various other commercially available liquid laundry starch products. The products are identified as Starch A, Starch B, etc., and are liquid laundry starches that are presently being sold to home consumers. The tested starches are the most widely sold products currently on the market.

In preparing Table I, standard size swatches of the same type cloth are weighed and then starched with the various starches. The starched swatches are ironed and weighed to determine the amount of starch in each sample. The weighed swatches are placed in chambers having fixed relative humidities. When the swatches have come to equilibrium with the atmosphere, they are weighed to determine how much water has been taken up. Table I shows the milligrams of water absorbed per milligram of starch per square centimeter of cloth area.

*Table I*

| Relative Humidity | Starch of Example I | Starch A | Starch B | Starch C | Starch D | Starch E |
|---|---|---|---|---|---|---|
| 60% | 0.13 | 0.22 | 0.22 | 0.19 | 0.18 | 0.15 |
| 70% | 0.31 | 0.58 | 0.53 | 0.44 | 0.42 | 0.38 |
| 80% | 0.56 | 1.23 | 1.18 | 0.87 | 0.83 | 0.74 |
| 90% | 0.83 | 2.25 | 1.95 | 1.49 | 1.44 | 1.18 |

The starch of Example I takes up an average of 22% less water than Starch E which has the best hygroscopic properties of the other tested starches and is the best product currently on the market. The starch of Example I takes up an average of 51.5% less water than Starch A.

Thus it is seen that the present invention includes a liquid laundry starch composition that fulfills all of the objects and advantages sought therefor.

This invention is intended to cover all changes and modifications of the examples of the invention herein chosen for purposes of the disclosure, which do not constitute departures from the spirit and scope of the invention.

What is claimed is:

1. A liquid laundry starch composition consisting essentially of a cooked starch dispersion including water and from about 7% to about 14% starch by weight based on the water, at least about 1% by weight based on the weight of dry starch of a polyethylene glycol ester of a fatty acid, and from about 10% to about 47.5% by weight based on the weight of dry starch of a mixture of boric acid and borax wherein there are about 1.6 parts boric acid to about 1 part borax.

2. A liquid laundry starch composition consisting essentially of a cooked starch dispersion including water and from about 7% to about 14% gelatinized starch by weight based on the weight of water, at least about 1% by weight based on the weight of dry starch of a mixture of polyethylene glycol esters of fatty acids having a molecular weight of from about 400 to about 1000, from about 10% to about 47.5% by weight based on the weight of dry starch of a mixture of boric acid and borax wherein there are about 1.6 parts boric acid to 1 part borax, and a small but effective amount of a bluing agent.

3. A liquid laundry starch composition consisting essentially of a cooked starch dispersion including about 10% of a hypochlorite oxidized gelatinized corn starch and water, about 1% by weight based on the weight of dry starch of a polyethylene glycol ester of stearic acid having a molecular weight of about 1000, about 1% by weight based on the weight of dry starch of a polyethylene glycol ester of lauric acid having a molecular weight of about 400 and from about 16% to about 16.5% by weight based on the weight of dry starch of a mixture of boric acid and borax wherein there are about 1.6 parts boric acid to each 1 part borax.

4. A method of preparing a liquid laundry starch including the steps of cooking a dispersion of from about 7% to about 14% by weight starch and water at a temperature above the gelatinization temperature of the starch, cooling the cooked starch to a temperature below about 180° F., adding from about 15.5% to about 17.5% by weight based on the weight of dry starch of a mixture of about 1.6 parts boric acid to 1 part borax, and a mixture of about 1% by weight based on weight of dry starch of polyethylene glycol monostearate having a molecular weight of about 1000 and about 1% by weight based on the weight of dry starch of polyethylene glycol monolaurate having a molecular weight of about 400.

5. A liquid laundry starch composition consisting essentially of a cooked starch dispersion including water and about 10% by weight starch, at least about 0.5% by weight based on the weight of starch of a polyethylene glycol ester of a fatty acid and from about 10% to about 47% of a mixture of boric acid and borax in the approximate ratio of about 1.6 parts boric acid to about 1 part borax.

6. A liquid laundry starch composition consisting essentially of a cooked aqueous dispersion of oxidized corn starch including water and from about 7% to about 14% by weight gelatinized oxidized corn starch, at least about 0.5% by weight based on the weight of starch of polyethylene glycol ester of fatty acid having a molecular weight of from about 400 to about 1000, and from about 10% to about 47% of a mixture of boric acid and borax in the approximate ratio of about 1.6 parts boric acid to about 1 part borax.

7. A method of preparing liquid laundry starch comprising adding from about 10% to about 47% of a mixture of boric acid and borax in the approximate ratio of 1.6 to 1 and at least about 0.5% by weight of a polyethylene glycol ester of a fatty acid to a dispersion of cooked starch including from about 7% to about 14% gelatinized starch and water.

8. A method of preparing liquid laundry starch comprising cooking an aqueous dispersion of about 7% to about 14% oxidized starch and water at a temperature above the gelatinization temperature of the starch, cooling the starch dispersion to a temperature below about 180° F., and adding thereto from about 10% to about 47% of a mixture of boric acid and borax wherein there are about 1.6 parts boric acid for each part borax and at least about 1% of at least one polyethylene glycol ester of a fatty acid.

9. A liquid laundry starch composition consisting essentially of a cooked starch dispersion including water and from about 7% to about 14% oxidized corn starch by weight based on the weight of water, at least about 0.5% by weight based on the weight of dry starch of a polyethylene glycol ester of a fatty acid and from about 15% to about 17.5% by weight based on the weight of dry starch of a mixture of boric acid and borax wherein there are about 1.6 parts boric acid to 1 part borax.

References Cited in the file of this patent

UNITED STATES PATENTS

| | | |
|---|---|---|
| 1,786,417 | Alexander | Dec. 30, 1930 |
| 2,174,760 | Schuette | Oct. 3, 1939 |
| 2,581,058 | Wise | Jan. 1, 1952 |
| 2,732,309 | Kerr | Jan. 24, 1956 |
| 2,819,980 | McCombs | Jan. 14, 1958 |
| 2,938,809 | Katzbeck | May 31, 1960 |

OTHER REFERENCES

Warth: The Chemistry and Technology of Waxes, 2nd Ed., Reinhold Pub. Corp., N.Y., 1956, pages 489–490.